Aug. 14, 1945.  J. T. MULLER  2,382,897
MATERIAL FORMING APPARATUS
Filed May 11, 1944  2 Sheets-Sheet 1

INVENTOR
J.T. MULLER
BY
E.R. Nowlan
ATTORNEY

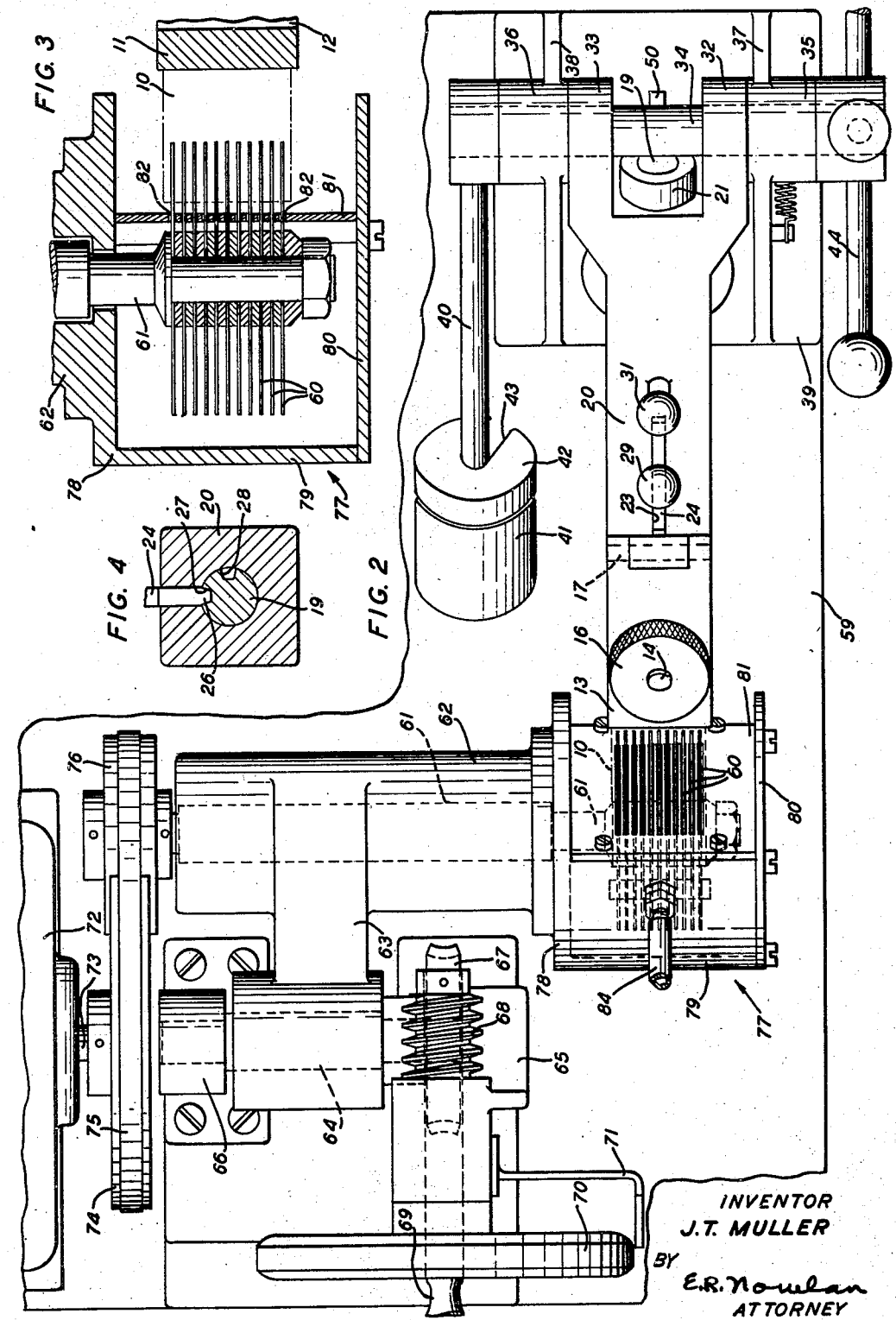

Patented Aug. 14, 1945

2,382,897

UNITED STATES PATENT OFFICE 2,382,897

MATERIAL FORMING APPARATUS

John T. Muller, Livingston, N. J., assignor to Western Electric Company, Incorporated, New York, N. Y., a corporation of New York Application May 11, 1944, Serial No. 535,172

6 Claims. (Cl. 125—13)

This invention relates to material forming apparatus, and more particularly to apparatus for sawing hard material such as quartz, silicon, glass and the like.

In recent developments in the electrical arts many uses have arisen for accurately dimensioned pieces of quartz, silicon and other similarly hard and usually brittle materials, usually in the form of slabs, slices "chequers" or "wafers," i. e. bodies generally laminar with two relatively broad flat parallel faces and a periphery which may be rectangular, square, circular or of other shape. In many instances such members are manufactured in quantity by cutting blanks from a body or block of the material in question, these blanks being cut in laminar form with two broad faces approximately parallel and approximately at the desired distance apart, to be brought subsequently to exact parallelism and spacing.

An object of the present invention is to provide suitable, simple and reliable apparatus for sawing material of the nature described and especially to make simultaneously a plurality of parallel saw cuts in a block of material of the nature described, with accurate control of the depth of cut and of the pressure under which the work and the tools are brought together.

With the above and other objects in views, the invention may be embodied in an apparatus for shaping hard material, a saw operative in a fixed plane, a shaft perpendicular to the plane of the saw, a support carried by the shaft and pivotable about the axis thereof in the plane of the saw, means on the support to engage and hold a work holder to feed a work piece held on the holder to the saw by pivoting motion of the support, means to move the support to feed the work piece to the saw, and means to resist the motion of the support and adjustable to control the pressure under which the work piece is fed to the saw.

Other objects and features of the invention will appear from the following detailed description of one embodiment thereof, taken in connection with the accompanying drawings, in which the same reference numerals are applied to identical parts in the several figures and in which Fig. 1 is a view in front elevation with parts broken away of an apparatus constructed in accordance with the invention;

Fig. 2 is a plan view thereof with parts broken away;

Fig. 3 is an enlarged section on the line 3—3 of Fig. 1; and

Fig. 4 is an enlarged section on the line 4—4 of Fig. 1.

Figure 1:
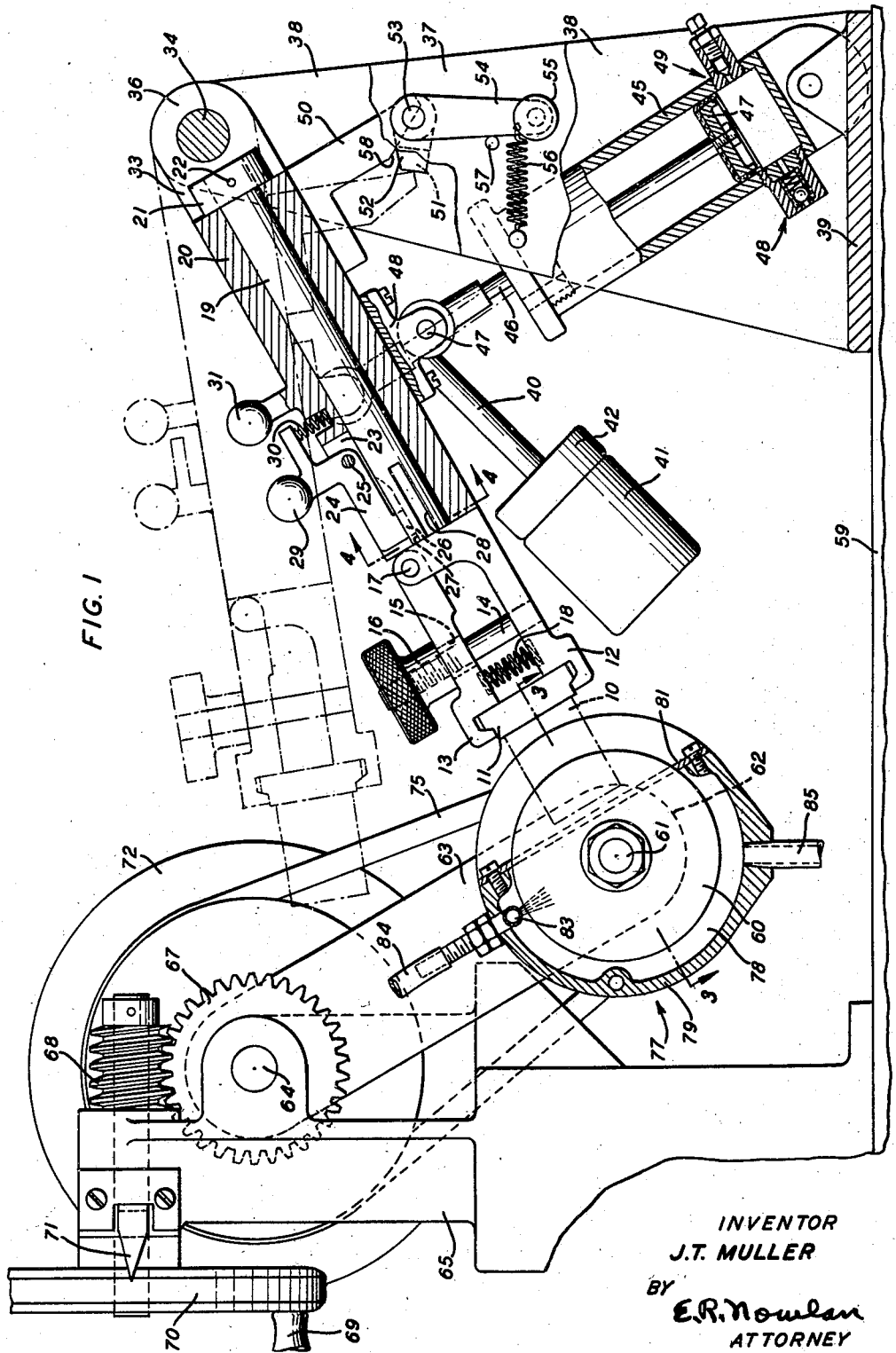

The embodiment selected to be herein shown and described as illustrative of the invention is an apparatus whose function is to make two pluralities of parallel saw cuts in a block of microcrystalline silicon shown in broken lines at 10 in the drawings, the block being secured, e. g. with cement, on a holder 11, which is a tabular block of metal, two of whose edges are formed, as shown, to be gripped immovably between jaws 12 and 13, which can be locked together by a bolt 14 mounted in the jaw 12 and extending through an appropriate slot 15 in the jaw 13 and furnished with a thumb nut 16. The upper jaw 13 is pivoted on the lower jaw 12 at 17; and a compression spring 18 tends to force the jaws apart when the nut 16 is released.

The jaw 12 is an integral extension of a relatively long and massive shaft 19 mounted to be rotatable but not axially slidable in a relatively massive corresponding sleeve 20, and locked in place in the sleeve by a collar 21 and pin 22. The sleeve has a longitudinal slot 23 therein in which is located one arm 24 of a bellcrank lever pivoted in the sleeve at 25 and having a key nose 26 to coact with either of two slots, 27 and 28 respectively, in the shaft 19 to lock the latter in either of two rotationally spaced positions in the sleeve 20 as best shown in Fig. 4. The arm 29 of the bellcrank lever is formed as a handle by which the nose 26 may be withdrawn from the slot 27 or 28 against the resilient resistance of a spring 30. A post 31 rigid on the sleeve 20 is provided to enable actuation of the lever arm 29 by pinching this and the post 31 to avoid tending to move the sleeve as a whole when actuating the lever 29.

The right or upper end of the sleeve 20 is formed with an integral bifurcation as a yoke with arms 32 and 33 in which is rigidly secured a shaft 34 journalled rotatably in and extending through bearings 35 and 36, respectively, formed on parallel brackets 37 and 38, respectively, which are rigid on a base member 39. On the outer end of the shaft 34 beyond the bearing 36, is rigidly secured a lever 40 on the outer end of which is secured a weight 41, permanently attached to the lever, while a removable weight 42, slotted at 43, rests on the weight 41. On the other outer end of the shaft 34 beyond the bearing 35, an actuating handle lever 44 is rigidly secured.

Between the brackets 37 and 38, a dashpot cylinder 45 is mounted on the base 39 to be rockable in a plane through the axis of the shaft 19 and perpendicular to the axis of the shaft 34. The piston rod 46 of the dashpot is pivotably attached at 47 to a member 48 secured on the under side of the sleeve 20. The dashpot may be of any suitable construction, the one illustrated here having a check valve 48 to admit air freely under the piston 47 on the upstroke and to close on the downstroke of the piston, while a needle valve 49 adjustably regulates the escape of air from under the piston and thereby the speed of the downstroke.

One the under side of the sleeve 20 is also secured a rigid stop member 50 extending outwardly at right angles thereto and adapted to make contact with a transverse stud 51 formed on the normally horizontal arm 52 of a bellcrank lever pivoted at 53 on the bracket 37. The stud 51 extends laterally across from the lever arm 52 toward the bracket 38 and into the swing path of the member 50, while the lever arm 52 is nearer the bracket 37 than is the member 51 and so cannot contact the latter. The other arm 54 of the bellcrank is outside the bracket 37, has a handle 55, and is urged clockwise by a tension spring 56 against a stop pin 57 mounted in the bracket 37. The forward face of the lower end of the member 50 is formed as a cam 58 capable of over-riding and depressing the stud 51 when the sleeve 20 is lifted from the position shown in full lines in Fig. 1 to the position shown in broken lines, while the stud will rise again under the urge of the spring 56 to lock the sleeve 20 in the elevated position until the stud is pulled down by manipulation of the lever arm 54.

The above described unit of the apparatus has the function of holding and feeding the work block 10 to the saw unit now to be described. Both units are mounted on and rigidly kept in proper relation to each other by some suitable support means 59, e. g. a rigid tabular base member, a table top, bench top or the like, to which the two units are secured by means not shown.

The saw unit comprises a gang of parallel circular saws 60 mounted on and driven by a horizontal shaft 61 whose axis is parallel to the axis of the shaft 34 about which the work block 10 swings in being fed to the saws to be cut. The shaft 61 is journalled in and carried by a sleeve 62 having an arm 63 by which the sleeve is pivotally mounted on a shaft 64 journalled in pedestals 65 and 66 mounted on the base 59. The arm 63 is rigid on the shaft 64 to be rotatable therewith; and the shaft 64 has a worm gear 67 rigid thereon to be driven by a worm 68 actuable by a handle 69 on a scale wheel 70 secured on the worm. A pointer 71 mounted on the pedestal 65 coacts with the scale on the wheel 70 to regulate the depth of cut of the saw 60 in the block 10 by enabling measured adjustment of the saws toward and from the work.

Some suitable power means 72, e. g. an electric motor, drives a shaft 73 coaxial with the shaft 64 and carrying a pulley 74 which, through a belt 75, drives a pulley 76 on the shaft 61 to drive the saws 60.

On the near end of the sleeve 62 is secured a housing generally indicated at 77 and comprising a rear wall 78 and a cylindrical side wall 79 integral therewith and an outer disc-like end wall 80 secured on the side wall. The side wall is cut away along a plane perpendicular to the plane of the axes of the shafts 61 and 34 and a flat cover 81 is secured across the opening so made positioned to be just clear of the end of the work as this swings through the saws which protrude through slots 82 in the cover 81.

A spray nozzle 83 to supply cooling fluid to the saws is mounted through the upper part of the side wall 79 and connected by a flexible pipe 84 to some suitable fluid supply (not shown). A drain 85 is similarly arranged in the under side of the side wall.

In operation, the saws having been set to the appropriate position by manipulation of the wheel 70 and handle 69, and the drive means 72 having been set in motion to drive the saws 60, the sleeve 20 and its associated parts are lifted into the position shown in broken lines in Fig. 1, by manipulation of the handle 44, and automatically locked in this position by the rise of the stud 51 behind the stop 50 after having been ridden down by the cam 58 to allow the stop 50 to pass. A work holder 11 having a block 10 of material to be sawed and cemented thereon, may then be conveniently put in place between the jaws 12 and 13 and clamped by the nut 16. Pulling back on the handle 55 then draws the stud 51 down out of engagement with the stop 50; and the weights 41 and 42 acting through the lever 40 causes the sleeve 20 and its associated parts to begin to move down from the broken line position of Fig. 1 toward the solid line position against the gradually yielding resistance of the dashpot 45. The speed of this motion, which feeds the work to and through the gang of saws, may be adjustably regulated, roughly by adding or subtracting weights 42 to or from the lever 40, and finely by manipulation of the needle valve 49. Unless otherwise stopped by the attendant, this motion will be halted by the piston of the dashpot coming to the lower end of its stroke. The sleeve 20 may then be raised again to its highest position and the work be removed if only one set of parallel cuts is to be made. However, as described in copending application Serial No. 535,169, filed of even date herewith by the same inventor, there are methods of manufacturing chequers (i. e. thin, square laminae) of crystal material, in which it is desirable to make two sets of parallel cuts, ordinarily at right angles to each other. For this purpose while the work piece 10, now having one set of parallel cuts therein, and the jaws 12 and 13 in their supporting sleeve 20 are again locked by the stud 51 above the saws, the nose 26 may be withdrawn from the slot 27 in the shaft 19, by manipulation of the handles 29 and 31, and the shaft 19 rotated until the nose 26 enters the slot 28 in the shaft 19. The work piece 10 is then rotated from its former position by an angle equal to the angular distance between the centers of the slots 27 and 28, ordinarily an accurate right angle, and is held in its new position rigidly with respect to the shaft 34. Hence, upon again withdrawing the stud 51 from engagement with the stop 50, a second set of mutually parallel cuts will be made in the work crossing the first set of cuts at an angle equal to the angle of rotation of the shaft 19, ordinarily a right angle. Upon again raising sleeve 20 to its uppermost position, the work, completed so far as the purview of the present invention extends, may be removed with its holder, and a new holder and piece placed in the jaws.

The above identified copending application is drawn to and describes in detail a complete method of manufacturing wafers (circular laminae) of hard and usually brittle material, in which a body of material is cut into parallel slices and reconstituted by cementing the slices together again, after which two sets of cuts are made across each other and also across the cemented slices. A primary purpose of the present invention is to provide suitable apparatus for the steps comprised in that method of making the two sets of cuts crossing each other, although, of course, the present invention is not so limited, but may be applied wherever a single set of parallel cuts is desired to be made in a piece of work, as well as where two or more such sets of cuts crossing each other at any predetermined angles are desired. Thus if the slot 28 be at sixty degrees (60°) to the slot 27 and a third such slot be provided at sixty degrees (60°) on the other side of the slot 27 from the slot 28, then, by suitably spacing the screws, the bars created from the work body by the three possible sets of cuts may all be equilaterally triangular in cross-section, or may be of two kinds, some hexagonal and some triangular. On the other hand, if only one set of parallel cuts is to be made, one or other of the slots 27 and 28 may be omitted. Any such arrangement is clearly within the scope and spirit of the present invention as pointed out in the appended claims, as would also be the case if all the saws 60 were removed from the shaft 61 except one, so that only one cut would be made at a time.

What is claimed is:

1. In an apparatus for shaping hard material, a saw operative in a fixed plane, a shaft perpendicular to the plane of the saw, a support carried by the shaft and pivotable about the axis thereof in the plane of the saw, means on the support to engage and hold a work holder to feed a work piece held on the holder to the saw by pivoting motion of the support, means to move the support to feed the work piece to the saw, means to resist the motion of the support and adjustable to control the pressure under which the work piece is fed to the saw, and means to adjust the position of the saw in the plane thereof toward and from the shaft.

2. In an apparatus for shaping hard material, a saw operative in a fixed plane, a shaft perpendicular to the plane of the saw, a support carried by the shaft and pivotable about the axis thereof in the plane of the saw, means on the support and rotatable thereon about an axis in the plane of the saw and perpendicular to the axis of the shaft to engage and hold a work holder in either of two angularly spaced positions to feed a work piece held on the holder to the saw by pivoting motion of the support, means to move the support to feed the work piece to the saw, means to resist the motion of the support and adjustable to control the pressure under which the work piece is fed to the saw, and means to adjust the position of the saw in the plane thereof toward and from the shaft.

3. In an apparatus for shaping hard material, a saw operative in a fixed plane, a shaft perpendicular to the plane of the saw, a sleeve carried by the shaft and pivotable about the axis thereof in the plane of the saw, a cylindrical member mounted in the sleeve to be rotatable therein about an axis perpendicular to the axis of the shaft, a pair of jaws carried by the member to engage and hold a work holder to feed a work piece held on the holder to the saw by pivoting motion of the support, means to lock the member in the sleeve in either of two angularly spaced positions therein, means to move the sleeve to feed the work piece to the saw, and an adjustable brake means to resist the motion of the sleeve and control the pressure under which the work piece is fed to the saw.

4. In an apparatus for shaping hard material, a saw operative in a fixed plane, a shaft perpendicular to the plane of the saw, a sleeve carried by the shaft and pivotable about the axis thereof in the plane of the saw, a cylindrical member mounted in the sleeve to be rotatable therein about an axis perpendicular to the axis of the shaft, a pair of jaws carried by the member to engage and hold a work holder to feed a work piece held on the holder to the saw by pivoting motion of the support, means to lock the member in the sleeve in either of two angularly spaced positions therein, means to move the sleeve to feed the work piece to the saw, an adjustable brake means to resist the motion of the sleeve and control the pressure under which the work piece is fed to the saw, and means to adjust the position of the saw in the plane thereof toward and from the shaft.

5. In an apparatus for shaping hard material, a saw operative in a fixed vertical plane, a horizontal shaft, a sleeve carried by the shaft and pivotable about the axis thereof in the plane of the saw, a cylindrical member mounted in the sleeve to be rotatable therein about an axis perpendicular to the axis of the shaft, the member being formed with a plurality of slots circumferentially angularly spaced, a pawl on the sleeve to engage in any one of the slots to hold the member in a corresponding one of a corresponding plurality of angularly spaced positions in the sleeve, a pair of jaws carried by the member to engage and hold a work holder to feed a work piece held on the holder to the saw by pivoting motion of the support, a weight to move the sleeve from an upper position thereof to a lower position thereof to feed the work piece to the saw, and an adjustable dashpot to resist the motion of the sleeve and control the pressure under which the work piece is fed to the saw.

6. In an apparatus for shaping hard material, a saw operative in a fixed vertical plane, a horizontal shaft, a sleeve carried by the shaft and pivotable about the axis thereof in the plane of the saw, a cylindrical member mounted in the sleeve to be rotatable therein about an axis perpendicular to the axis of the shaft, the member being formed with a plurality of slots circumferentially angularly spaced, a pawl on the sleeve to engage in any one of the slots to hold the member in a corresponding one of a corresponding plurality of angularly spaced positions in the sleeve, a pair of jaws carried by the member to engage and hold a work holder to feed a work piece held on the holder to the saw by pivoting motion of the support, a weight to move the sleeve from an upper position thereof to a lower position thereof to feed the work piece to the saw, an adjustable dashpot to resist the motion of the sleeve and control the pressure under which the work piece is fed to the saw, and means to adjust the position of the saw in the plane thereof toward and from the shaft.

JOHN T. MULLER.